(12) United States Patent
Inman

(10) Patent No.: US 12,429,029 B2
(45) Date of Patent: Sep. 30, 2025

(54) WIND TURBINE SYSTEM

(71) Applicant: Tempest Energy Systems, LLC, Waxhaw, NC (US)

(72) Inventor: Hollis Charles Casey Inman, Waxhaw, NC (US)

(73) Assignee: Tempest Energy Systems, LLC, Waxhaw, NC (US)

( * ) Notice: Subject to any disclaimer, the term of this patent is extended or adjusted under 35 U.S.C. 154(b) by 0 days.

(21) Appl. No.: 18/667,727

(22) Filed: May 17, 2024

(65) Prior Publication Data

US 2025/0092856 A1     Mar. 20, 2025

Related U.S. Application Data

(60) Provisional application No. 63/539,126, filed on Sep. 19, 2023.

(51) Int. Cl.
| | |
|---|---|
| *F03D 7/06* | (2006.01) |
| *F03D 3/02* | (2006.01) |
| *F03D 3/04* | (2006.01) |
| *F03D 9/11* | (2016.01) |
| *H02K 7/18* | (2006.01) |

(52) U.S. Cl.
CPC ............. *F03D 7/06* (2013.01); *F03D 3/02* (2013.01); *F03D 3/04* (2013.01); *F03D 9/11* (2016.05); *H02K 7/183* (2013.01); *F05B 2270/321* (2013.01); *F05B 2270/327* (2013.01); *F05B 2270/80* (2013.01)

(58) Field of Classification Search
CPC ..... F03D 7/06; F03D 9/11; F03D 3/02; F03D 3/04; H02K 7/183; F05B 2270/321; F05B 2270/327; F05B 2270/80
See application file for complete search history.

(56) References Cited

U.S. PATENT DOCUMENTS

| | | | |
|---|---|---|---|
| 2,218,867 A | 10/1940 | Beldimano | |
| 4,220,870 A | 9/1980 | Kelly | |
| 5,642,984 A | 7/1997 | Gorlov | |
| 6,848,892 B1 * | 2/2005 | Morita ............... | F04B 35/045 310/27 |

(Continued)

FOREIGN PATENT DOCUMENTS

| | | | | |
|---|---|---|---|---|
| WO | WO-02101233 A1 * | 12/2002 | ............... | F03D 3/02 |
| WO | WO-2014025124 A1 * | 2/2014 | ............... | F03D 3/04 |
| WO | 2018/178701 A1 | 10/2018 | | |

*Primary Examiner* — Viet P Nguyen

(74) *Attorney, Agent, or Firm* — McGuire Woods LLP

(57) ABSTRACT

A wind turbine system includes a stator structure where the stator structure includes a plurality of structural members and a top plate positioned at a top end of the stator structure. Collectively, the plurality of structural members, the top plate, and a generator housing positioned distal to the top plate define an interior volume within the stator structure. A turbine includes a drive shaft positioned along a central axis extending from the top plate to the generator housing. A plurality of rotors is positioned along the drive shaft, where each rotor of the plurality of rotors are separated from one or more adjacent rotors of the plurality of rotors along the central axis via one or more separator plates each defining a stability plane extending perpendicular to the central axis. Additionally, a generator is positioned in the generator housing.

17 Claims, 16 Drawing Sheets

(56) References Cited

U.S. PATENT DOCUMENTS

| | | |
|---|---|---|
| 7,573,148 B2 | 8/2009 | Nica |
| 7,824,060 B2 | 11/2010 | Pelken et al. |
| 8,063,503 B2 | 11/2011 | Bahari |
| 8,766,480 B2 | 7/2014 | Hiller et al. |
| 9,157,414 B2 | 10/2015 | Bates et al. |
| 9,599,092 B2 | 3/2017 | Hossain et al. |
| 10,815,967 B2 | 10/2020 | Geisler et al. |
| 11,060,506 B2 | 7/2021 | Rodway et al. |
| 11,143,163 B2 | 10/2021 | Juarez |
| 2012/0070293 A1 | 3/2012 | Cwiertnia et al. |
| 2012/0148403 A1* | 6/2012 | Flaherty ............... F03D 3/02 290/55 |
| 2017/0045034 A1* | 2/2017 | Lai ................. F03D 3/0427 |
| 2020/0408191 A1* | 12/2020 | Kittel ............... F03D 3/061 |
| 2021/0079892 A1 | 3/2021 | Messing et al. |
| 2021/0207580 A1 | 7/2021 | Egedal et al. |

\* cited by examiner

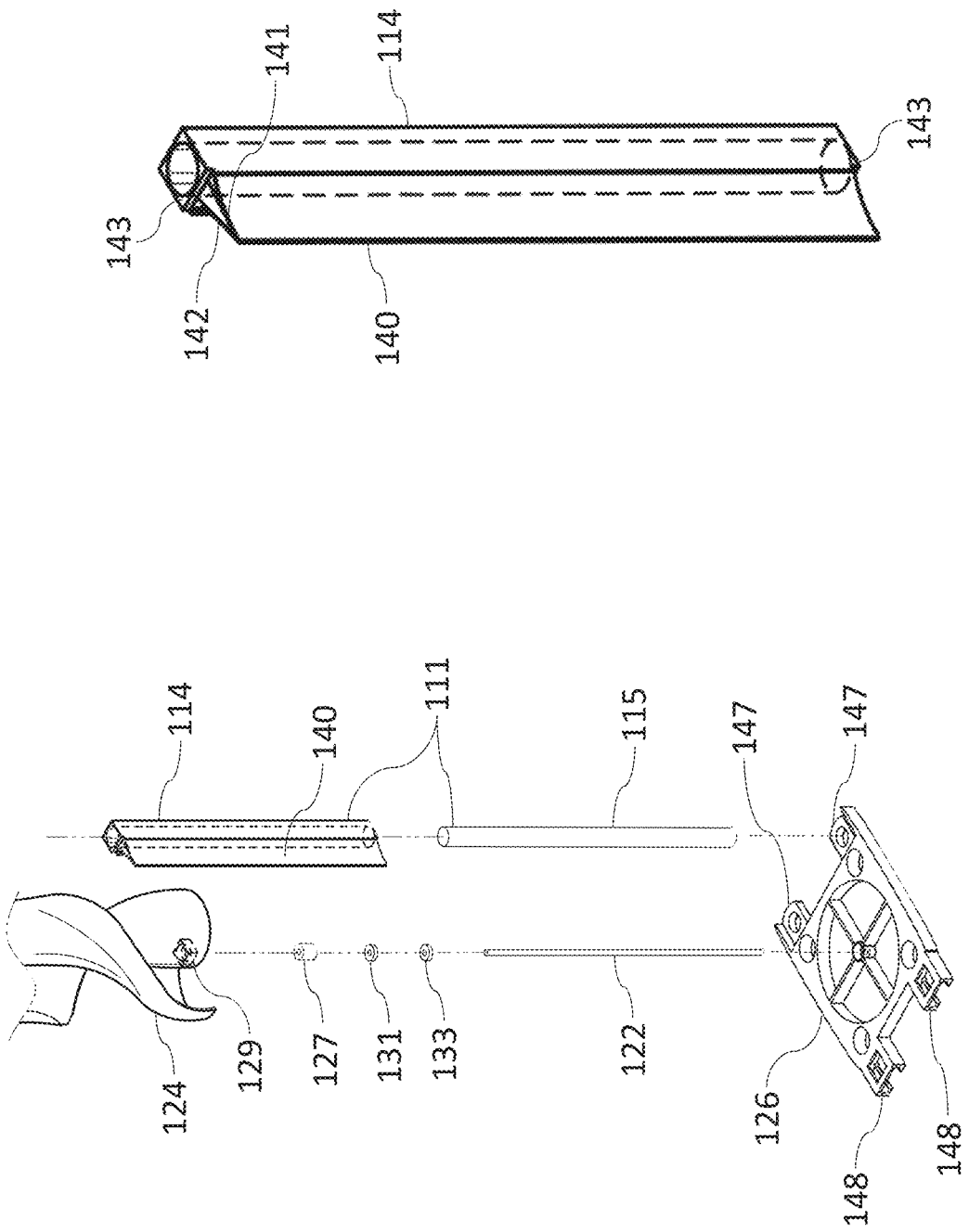

WIND TURBINE SYSTEM

CROSS-REFERENCE TO RELATED APPLICATIONS

This application claims priority to U.S. Provisional Patent Application 63/539,126, filed Sep. 19, 2023, which is hereby incorporated by reference in its entirety.

BACKGROUND

Wind power is a readily available resource that is capable of being captured and converted into electricity. Equipment and systems utilized for capturing wind power are usually incorporated into large wind turbines located within a wind farm setting. These large wind turbines are generally over 200 feet in height and, due to the size, supply enough power to support a whole community of individuals. Because of the size of these wind turbines, failure of and damage to the wind turbines requires extensive time, energy, and monetary resources in order to maintain and repair.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 4A is an illustration of a deconstructed view of a portion of a modular wind turbine system in accordance with certain embodiments of the present disclosure;

FIG. 4B is an illustration of a perspective view of a shroud member including a baffle portion in accordance with certain embodiments of the present disclosure;

Figure 1:
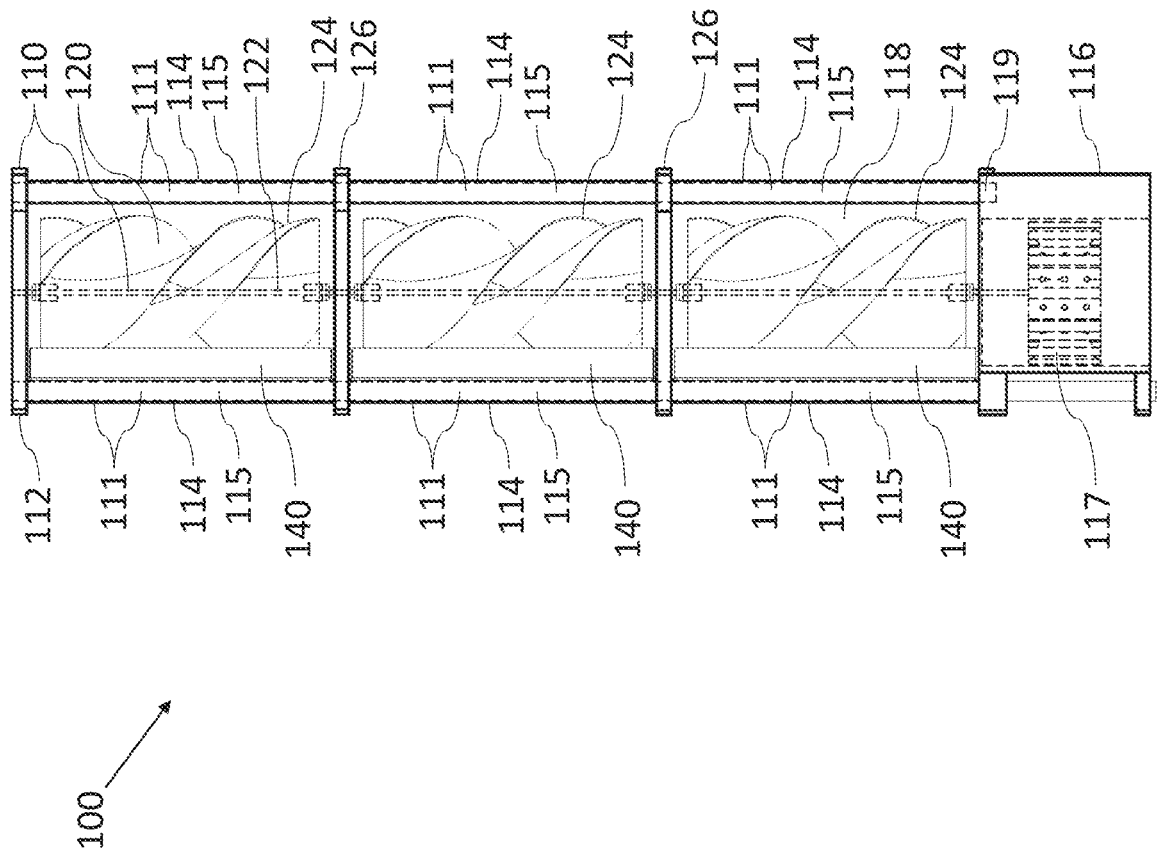
FIG. 1 is an illustration of a front view of a modular wind turbine system in accordance with certain embodiments of the present disclosure.

The illustrated figures are only exemplary and are not intended to assert or imply any limitation with regard to the environment, architecture, design, or process in which different examples may be implemented.

DETAILED DESCRIPTION

The present invention relates generally to wind turbines, and more particularly to modular wind turbines. The term "modular" is used herein to describe a singular wind turbine system that is interconnectable to one or more other wind turbine systems in order to create a larger structure that increases an amount of energy that can be harvested from the wind at a specific location. The term "cut-in speed" is used herein to refer to a minimum amount of power (Watts) required by an electrical load attached to a wind turbine system relative to the speed of the fluid flowing through the system. It is noted that maximum system output of a wind turbine system is determined by the load capacity of a driveshaft, the driveshaft couplings, stator coil(s), EMF generated by the rotation of rotor(s), and any calibrated brake(s) incorporated into the system.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

Unless otherwise indicated, all numbers expressing quantities of components, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit. Further, although voltage signals discussed herein are discussed as positive voltages, a negative voltage signal or differential voltage signal may be generated, used, or detected without departing from the scope of the present invention.

Presented herein is a wind turbine system. The wind turbine system includes a stator structure comprising a plurality of structural members and a top plate positioned at a top end of the stator structure, where the plurality of structural members, the top plate, and a generator housing positioned distal to the top plate define an interior volume within the stator structure. The wind turbine system further includes a turbine comprising a drive shaft positioned along a central axis extending from the top plate to the generator housing and a plurality of rotors positioned along the drive shaft, where each rotor of the plurality of rotors is separated from one or more adjacent rotors of the plurality of rotors along the central axis via one or more separator plates each defining a stability plane extending perpendicular to the central axis. Additionally, a generator is positioned in the generator housing.

Also presented herein is the wind turbine system as described above and further including an anemoscope affixed to the stator structure. A motor is rotationally affixed to each of the plurality of structural members comprising a respective one of the at least one baffle portion. A controller is electrically connected to the anemoscope and the motor, where the controller is configured to: receive wind direction data from the anemoscope and adjust, based on the wind direction data, a rotational output for the motor to position each of the at least one baffle portion at a deflection angle for deflecting a maximum amount of wind toward respective rotors of the plurality of rotors.

Also presented herein is the wind turbine system as described previously and further including a motor rotationally affixed to each of the plurality of structural members comprising a respective one of the at least one baffle portion. A controller is electrically connected to the generator and the motor, where the controller is configured to: receive rotation speed data from the generator and adjust, based on the rotation speed data, a rotational output for the motor to position each of the at least one baffle portion at a drag angle for decreasing a rotational speed of respective rotors of the plurality of rotors.

FIG. 1 is an illustration of a front view of a modular wind turbine system 100 in accordance with certain embodiments of the present disclosure. Wind turbine system 100, in certain embodiments, includes a rotation axis of one or more rotors 124 substantially parallel to a direction of airflow. In other embodiments, Wind turbine system 100 includes a stator structure 110 comprising a plurality of structural members 111 and a top plate 112. As shown, the plurality of structural members 111, the top plate 112, and a generator housing 116 positioned distal to top plate 112 define an interior volume 118 within stator structure 110. A turbine 120 is positionable within interior volume 118 and includes a drive shaft 120 positioned along a central (rotation) axis extending from the top plate 112 to the generator housing 116. Turbine 120 includes a drive shaft 122 positioned along a central axis extending from top plate 112 to generator housing 116. Turbine 120 further includes a plurality of rotors 124 positioned along drive shaft 120, where each rotor 124 of the plurality of rotors 124 is separated from one or more adjacent rotors 124 of the plurality of rotors 124 along the central axis via one or more separator plates 126 each defining a stability plane extending perpendicular to the central axis. As further shown, sets (of four) of the plurality of structural members 111 are positioned adjacent each rotor 124 and are positioned parallel to the central axis. The sets of structural members 111 define the interior space 118 where each rotor 124 may be positioned. Generator housing 116, as shown, is configured to receive a generator 117 (shown positioned within generator housing 116). In order to connect structural members 111 to generator housing 116, generator housing 116 may include a cavity 119 for each of the structural members 111 to be positioned within. In the embodiment shown, the cavities and structural members 111 are form-fitting. In embodiments, the rotation axis may be the central axis.

It is noted that structural members 111 may span the entire length of stator structure 110 (from generator housing 116 to top plate 112). In this configuration, each of the structural members 111 comprise a frame member 115 that extends from cavity 119 to top plate 112 and defines an interior structure of structural members 111. Each of the structural members further include, in the embodiment shown, multiple shroud members 114 that are positioned over structural members 111 and extend between any of: generator housing 116 and a separator plate 126, a separator plate 126 and another separator plate 126, and a separator plate 126 and top plate 112. In an embodiment in which turbine 120 includes a single rotor 124, frame members 115 and shroud members 114 may both extend from a generator housing 116 to a top plate 112.

Figure 2B:
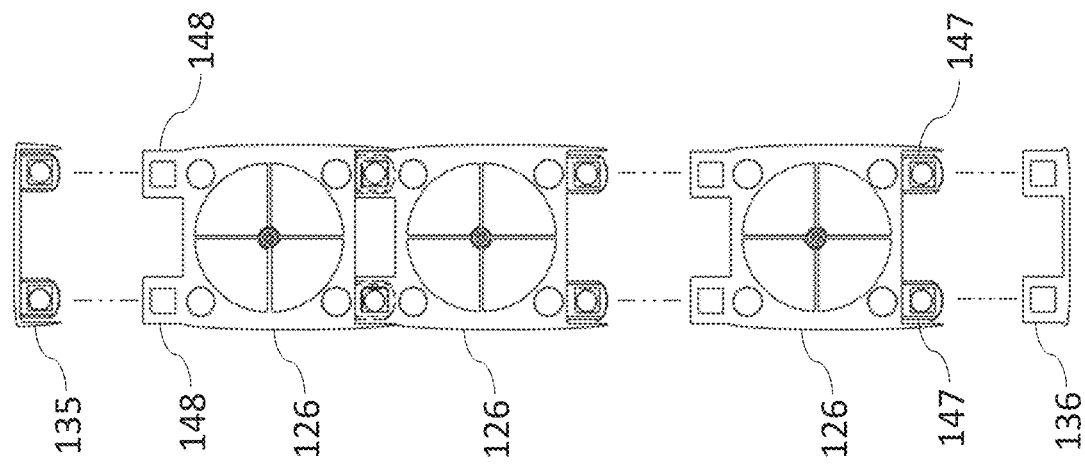
FIG. 2B is an illustration of a partially deconstructed view of a plurality of separator plates in accordance with certain embodiments of the present disclosure.
Figure 2A:
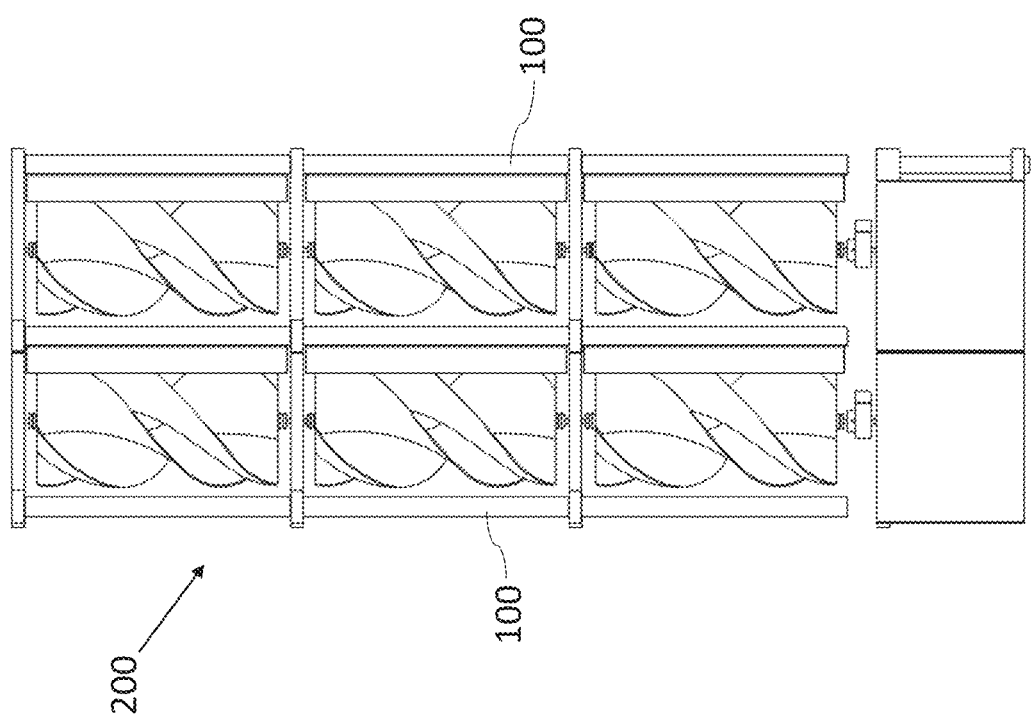
FIG. 2A is an illustration of a front view of a pair of modular wind turbine systems affixed to one another and forming a wind turbine assembly in accordance with certain embodiments of the present disclosure.

FIG. 2A is an illustration of a front view of a pair of modular wind turbine systems 100 affixed to one another and forming a wind turbine assembly 200 in accordance with certain embodiments of the present disclosure. As shown, each of the wind turbine systems 100 may be affixed to each other via one or more sets of male attachment segments 147 located at attachment edges (see FIG. 2B) of separator plates 126 of one of the wind turbine systems 100 positioned within corresponding female attachment segments 148 (see FIG. 2B) located at attachment edges of separator plates 126 of the other of the wind turbine systems 100. By utilizing this configuration, the wind turbine systems 100 may be removably affixable to one another along one or more stability planes (that align with separator plates 126 and male/female attachment segments 147,148). As a result, any number of wind turbine systems 100 can be affixed to one another in order to maximize a mechanical/electrical energetic output in an efficient space. As shown in FIG. 2B, three adjacent separator plates 126 are shown being attached/attachable to one another via the male and female attachment segments 147,148. Female and male end caps 135,136 are attached to any exposed male and female attachment segments 147,148.

It is noted that each female attachment segment 148 of each separator plate 126 includes a square orifice, while each male attachment segment 147 of each separator plate 126 includes a circular orifice surrounded by a square-shaped divot. The size of the square orifices and the circular orifices ensure that frame members 115 (which, in embodiments, are cylindrical in nature) are able to pass through separator plates 126. On the other hand, the size of the square orifices and the square-shaped divots ensure that flanged ends of shroud members 114 (see FIGS. 4A and 4B) fit securely to separator plates 126 so that shroud members 114 and separator plates 126 effectively define interior volumes 118 for rotors 124 and so that separator plates 126 do not collapse onto one another.

Figure 3B:
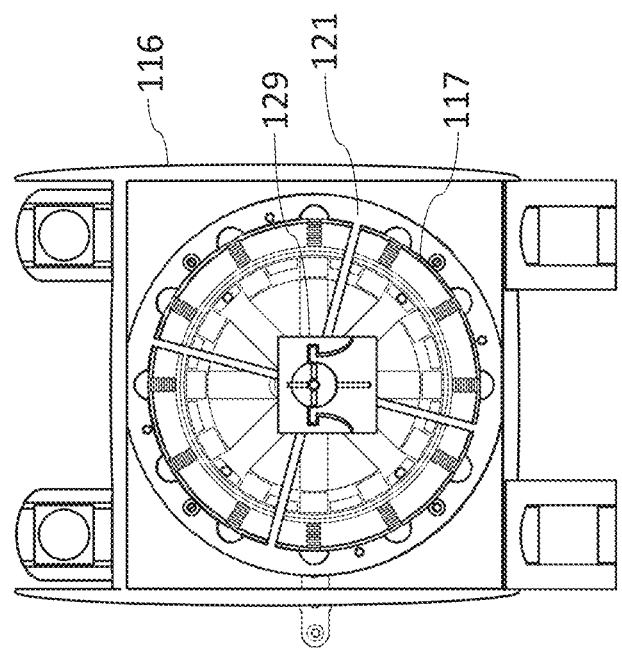
FIG. 3B is an illustration of a top view of a drive shaft attachment mechanism positioned adjacent a generator housing in accordance with certain embodiments of the present disclosure.
Figure 3A:
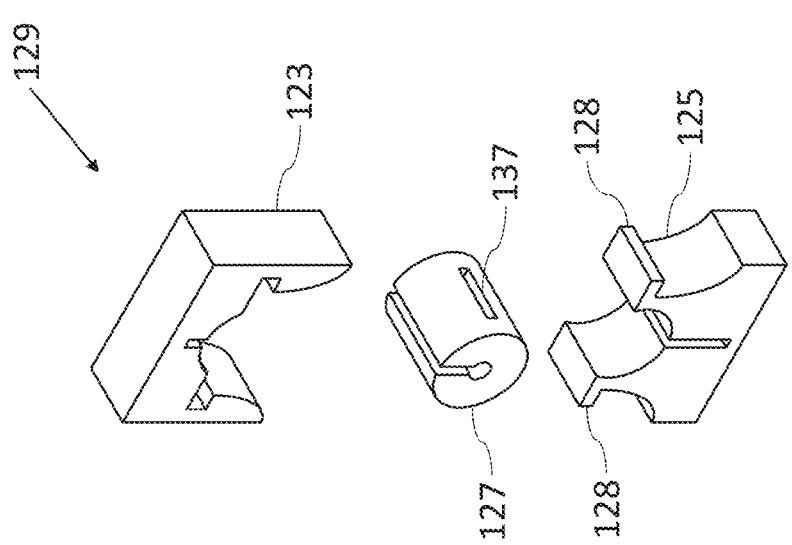
FIG. 3A is an illustration of a deconstructed view of a drive shaft attachment mechanism of a modular wind turbine system in accordance with certain embodiments of the present disclosure.

FIG. 3A is an illustration of a deconstructed view of a drive shaft attachment mechanism 129 of a modular wind turbine system 100 in accordance with certain embodiments of the present disclosure. As shown, drive shaft attachment mechanism 129 is shown separated from a rotor 124 (shown affixed to/integrated with rotor 124 in FIGS. 4A and 5B) and includes a female attachment segment 123 and a male attachment segment 125 that forms a buckle configuration for securing a drive shaft compression fitting 127. When in use, drive shaft compression fitting 127 is positioned within male and female attachment segments 125,123 as prongs 128 are pushed into female attachment segment 123. Once male and female attachment segments 125,123 are connected, female attachment segment 123 compresses prongs 128 inward toward drive shaft compression fitting 127, where portions of prongs 128 are lodged into fitting orifice 137 and create additional securement for drive shaft compression fitting 127. Slits are defined within female attachment segment 123, male attachment segment 125, and drive shaft compression fitting 127 in order to provide flexibility and to allow drive shaft 120 to be positioned within drive shaft compression fitting 127. As shown, in FIG. 3B, drive shaft attachment mechanism 129 is shown positioned adjacent generator housing 116. In order to avoid having a rotor fall into generator housing 116, a generator cap 121 is affixed to generator housing 116 and, as shown, includes a structure that crosses a generator orifice in generator housing 116 where generator 117 is housed. In embodiments, generator cap 121 may be at least one of: integral with generator housing 116 and affixed to generator housing 116 as a separate piece.

FIG. 4A is an illustration of a deconstructed view of a portion of a modular wind turbine system 100 in accordance with certain embodiments of the present disclosure. As shown, one end of drive shaft 122 is positionable in a circular indentation positioned in the middle of separator plate 126. Ring-shaped first and second magnets 131,133 are positioned on drive shaft 122 and adjacent the circular indentation with opposing poles of magnets 131,133 facing each other (causing repulsion). This may provide a "levitation" effect to drive shaft compression fitting 127 and rotor 124 so that rotor 124 may rotate more smoothly around drive shaft 122. In an embodiment, first and second magnets 131,133 are positioned adjacent top and bottom ends to provide a "levitation" effect to both ends of rotor 124; this configuration also equally distributes rotor 124 along drive shaft 122 and between two of the one or more stability planes. As further shown, a frame member 115 is positionable within/through one of male/female attachment segments 147,148 and is configured to provide rigidity to shroud member 114 and to wind turbine system 100 as a whole. Shroud member 114 includes a baffle portion 140 that extends the length of shroud member 114 and may be utilized to direct airflow toward or away from a rotor 124 and/or reduce a speed of a rotor 124 via friction. In embodiments, structural member 114 is rotatable in order to position baffle portion 140 to contact an adjacent rotor 124; in additional embodiments, wind turbine system 100 includes multiple rotatable structural members 114 that may be configured to position multiple baffle portions 140 in contact with multiple adjacent rotors 124. As further shown in FIG. 4B, baffle portion 140 extends an entire length of shroud member 114 and is positioned on a single side of shroud member 114. Baffle portion 140 includes a first edge 141 that is configured to direct airflow toward a rotor 124 while a second, opposing edge 142 is configured to direct airflow away from rotor 124. Depending on the orientation of structural member 114, the functionality of each edge 141, 142 may vary. In embodiments, baffle portion 140 comprises at least one of rubber or silicone. In other embodiments, baffle portion 140 comprises a plastic material such as, but not limited to: TPU and TPC.

It is noted that, as shown, top ends and bottom ends of shroud member 114 include flanged ends that are configured to securely fit into square orifices and square-shaped divots of male and female attachment segments 147,148.

Figure 4D:
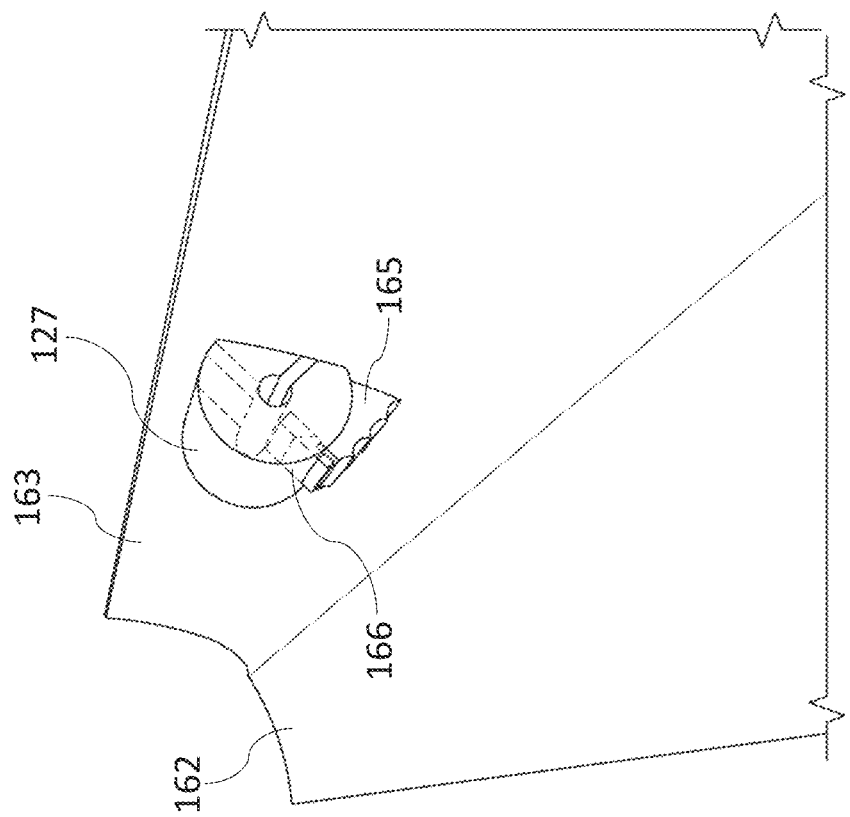
FIG. 4D is an illustration of a zoomed-in view of the alternative baffle portion of FIG. 4C in accordance with certain embodiments of the present disclosure.
Figure 4C:
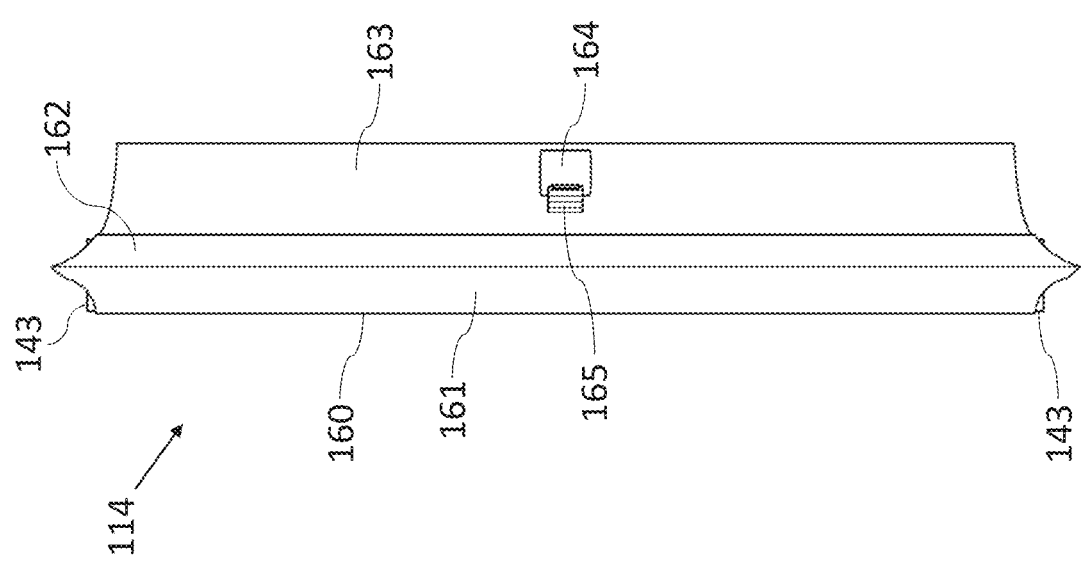
FIG. 4C is an illustration of a perspective view of a structural member including an alternative baffle portion in accordance with certain embodiments of the present disclosure.

FIG. 4C is an illustration of a perspective view of a shroud member 114 including an alternative baffle portion 160 in accordance with certain embodiments of the present disclosure. As shown, alternative baffle portion 160, similarly to baffle portion 140 of FIG. 4B, extends an entire length of shroud member 114 and is positioned on a single side of shroud member 114. Alternative baffle portion 160 also similarly includes a first edge 161 that is configured to direct airflow toward a rotor 124 while a second, opposing edge 162 is configured to direct airflow away from rotor 124. Second edge 162 additionally includes an extended edge 163 that extends from and along the curvature of second edge 162. A curved slot 164 and protrusion 165 are positioned within second edge 162 for receiving a drive shaft compression fitting 127. In this embodiment, when alternative baffle portion 160 is positioned adjacent a rotor 124, second edge 162 and extended edge 163 sit just outside of the rotation path of rotor 124, while drive shaft compression fitting 127 sits within the rotation path of rotor 124 and acts as a braking device for rotor 124 (by reducing a rotation speed of rotor 124 via friction) to avoid overloading generator 117. As shown in FIG. 4D and when in use, drive shaft compression fitting 127 is partially positioned within slot 164. A hooked end 166 of a protrusion 165 positioned adjacent slot 164 extends into a fitting orifice 137 of compression fitting 127 in order to keep compression fitting 127 in place.

Figure 5B:
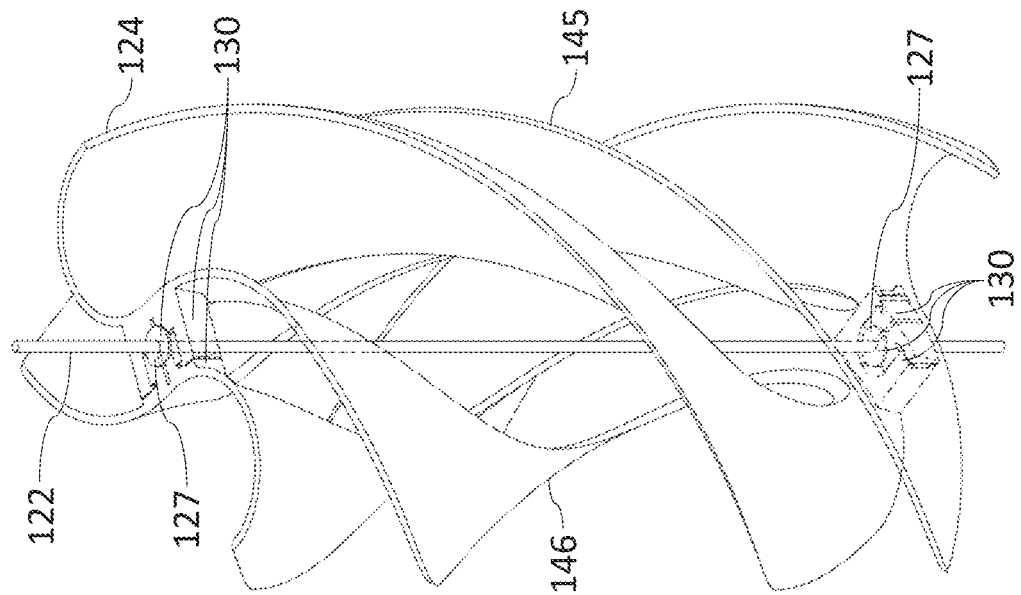
FIG. 5B is an illustration of a constructed partial cutaway view of a rotor in accordance with certain embodiments of the present disclosure.
Figure 5A:
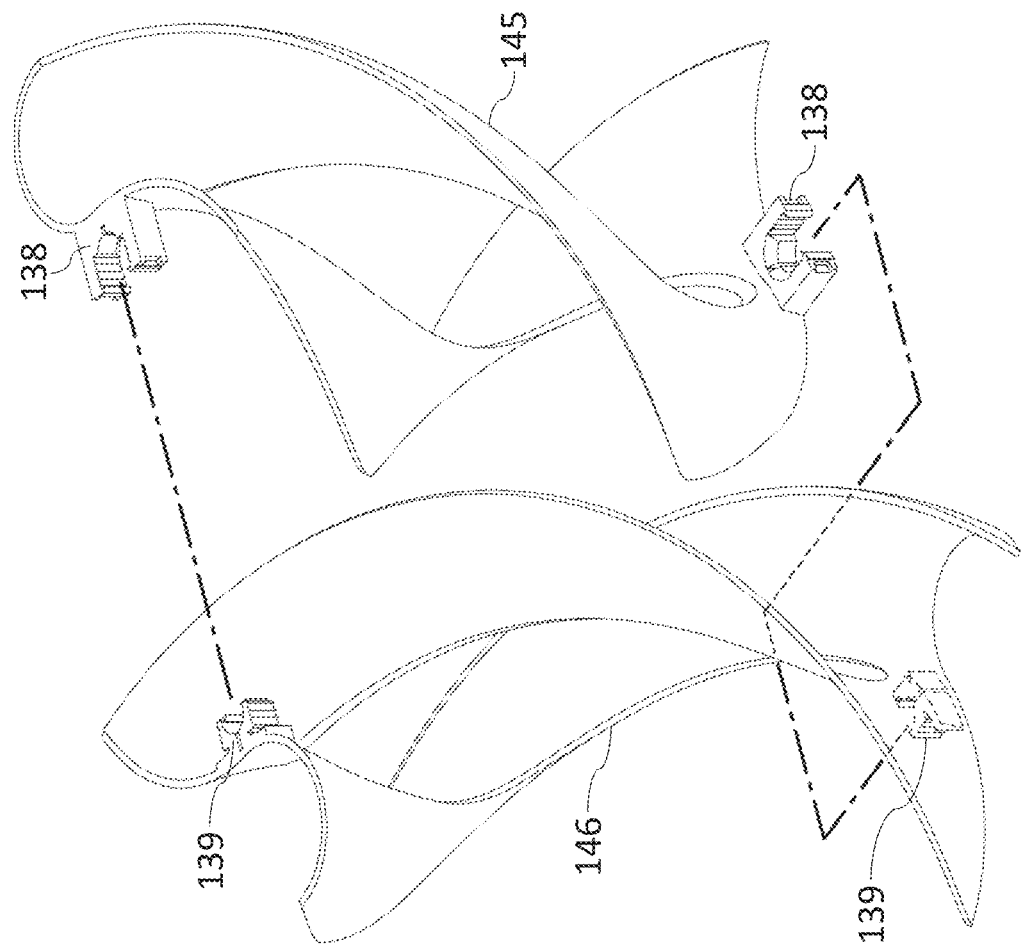
FIG. 5A is an illustration of a deconstructed view of a rotor in accordance with certain embodiments of the present disclosure.

FIG. 5A is an illustration of a deconstructed view of a rotor 124 in accordance with certain embodiments of the present disclosure. As shown, a pair of rotor blade sections (female rotor blade section and male rotor blade section 145,146) are disassembled from one another. Female and male rotor blade sections 145,146 each include a helical configuration having a pair of helical blades that together, are configured as a Ugrinsky wind turbine (rotor 124). In other embodiments, rotor 124 may comprise a geometry other than a Ugrinsky wind turbine and may include, but is not limited to: Benesh; Bach; and modified versions of the Ugrinsky, Benesh, and Bach geometries. Blade sections 145,146 are attachable to one another (and to drive shaft 122) via female/male attachment segments 123,125 and drive shaft compression fitting 127 (similar to embodiments discussed previously). In order to combine female and male rotor blade sections 145,146, one of the blade sections 145,146 is wound around the other of the blade sections 145,146 until top and bottom female and male attachment segments 123,125 are aligned with and attachable to one another.

As shown in FIG. 5B, female rotor blade section 145 and male rotor blade section 146 are combined to form a single rotor 124. The sections 145,146 are affixed at upper and lower alternative drive shaft attachment mechanisms 130 (conceptually similar to drive shaft attachment mechanism 129). In order to form upper drive shaft attachment mechanism 130, drive shaft compression mechanism 127 (attached to drive shaft 122) is positioned within an upper male attachment segment 139 and an upper female attachment segment 138. Similarly to drive shaft attachment mechanism 129, prongs of upper male attachment segment 139 are pushed into the body of upper female attachment segment 138 (collectively utilized as a buckle configuration) while drive shaft compression fitting 127 is positioned between upper male and female attachment segments 139,138. Once upper male and female attachment segments 139,138 are connected, upper female attachment segment 138 compresses upper male attachment segment 139 inward toward drive shaft compression fitting 127, where the compression force of upper female attachment segment 138 acting upon upper male attachment segment 139 provides additional securement to drive shaft compression fitting 127. It is noted that lower male and female attachment segments 139,138 are affixable in the same way as described above to form lower alternative drive shaft attachment mechanism 130.

Figure 6A:
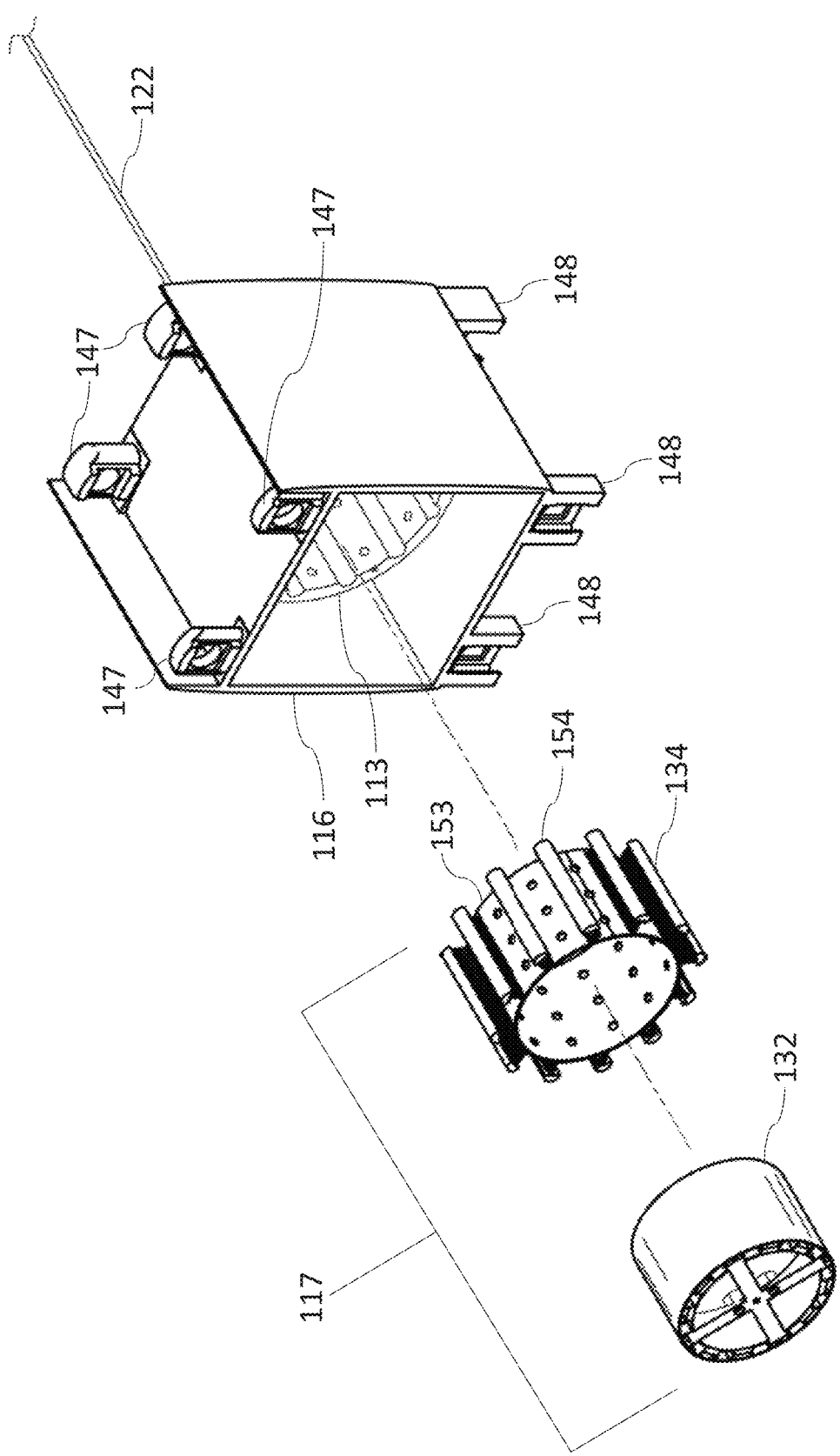
FIG. 6A is an illustration of a deconstructed view of a generator housing in accordance with certain embodiments of the present disclosure.
Figure 6B:
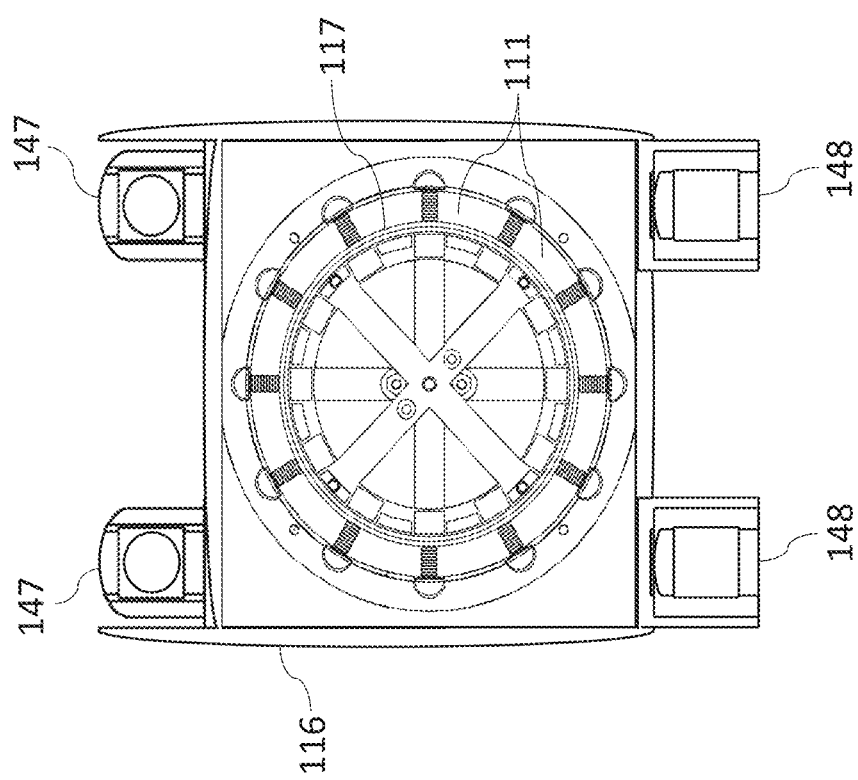
FIG. 6B is an illustration of a top view of a generator housing in accordance with certain embodiments of the present disclosure.

FIG. 6A is an illustration of a deconstructed view of a generator housing 116 in accordance with certain embodiments of the present disclosure. As shown, generator housing 116 includes a stator shell 113 configured to receive stator slots of a stator 134. A stator base 153 is configured to receive a rotor 132 and comprises a circumference smaller than that of stator shell 113 so that when stator slots 154 are positioned within stator shell 113, spaces are formed between adjacent stator slots 154. These spaces are shown in FIG. 6B and form diversion manifolds 111 that are utilized as alternate flow paths for accumulated airflow that is built up due to back pressure. As drive shaft 122 rotates due to airflow, rotor 132, which is attached to drive shaft 122, is subsequently rotated within stator 134, converting the mechanical rotational energy into electrical energy. This electrical energy, in embodiments, may be transferred/supplied to one or more batteries (not depicted) for storage.

In an embodiment, when stator 134 is placed within stator shell 113, diversion manifolds 111 are formed between the two elements. In this configuration, diversion manifolds 111 provide alternate flow paths that transport air accumulated within stator structure 110 that typically causes back pressure (caused by any wind not drawn into the stator structure 110).

Figure 7B:
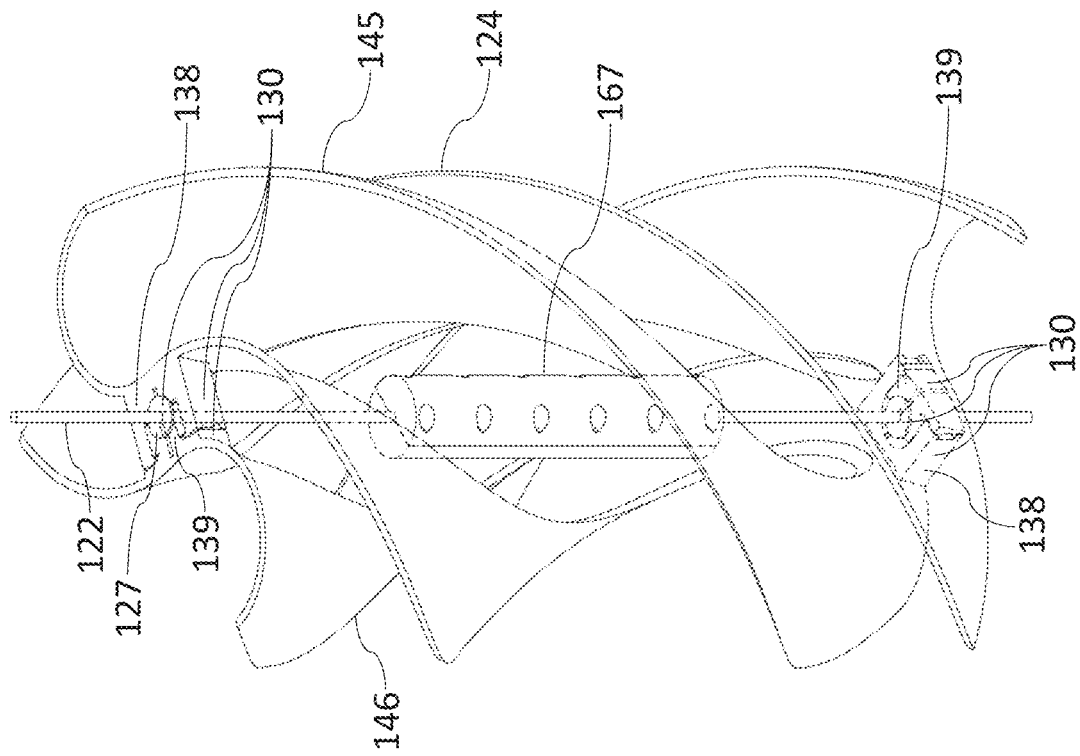
FIG. 7B is an illustration of a partial cutaway view of the drive shaft coupler and multiple drive shafts of FIG. 7A positioned within a rotor in accordance with certain embodiments of the present disclosure.
Figure 7A:
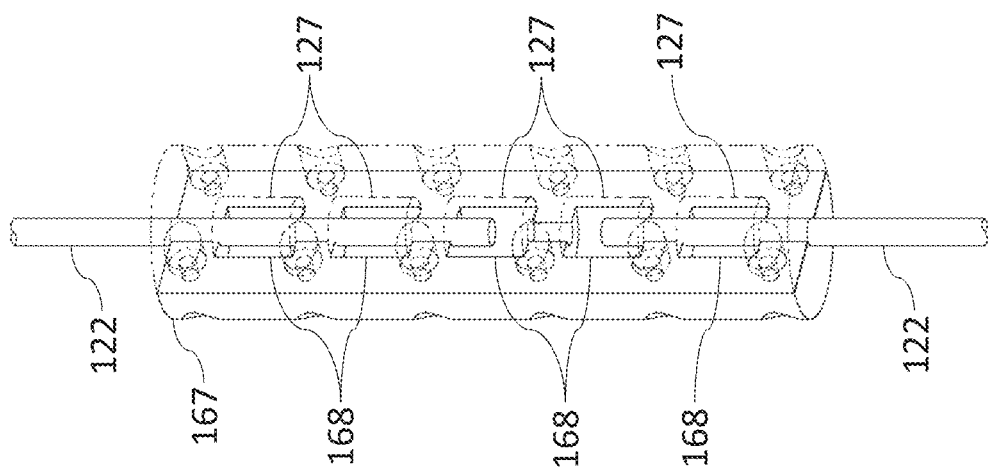
FIG. 7A is an illustration of a partial cutaway view of a drive shaft coupler affixed to multiple drive shafts in accordance with certain embodiments of the present disclosure.

FIG. 7A is an illustration of a partial cutaway view of a drive shaft coupler 167 affixed to multiple drive shafts 122 in accordance with certain embodiments of the present disclosure. As shown, drive shaft coupler 167 is configured to bind two non-contiguous drive shafts 122 together in order to provide a less variable and more controlled amount of torque and power to one or more generators (not depicted) associated with a wind turbine system. This ultimately leads to a mitigation of overspeed conditions for a wind turbine system, avoiding burnout of one or more associated generators. Drive shaft coupler 167 includes multiple slots 168 for receiving one or more drive shaft compression fittings 127. As shown, ends of the drive shafts 122 may be positioned in separate slots 168/drive shaft compression fittings 127 while in other embodiments, ends may be positioned in a single slot 168/drive shaft compression fitting 127. In order to increase the binding strength of drive shafts 122, multiple drive shaft compression fittings 127 may be affixed to each of the drive shafts 122. For example, drive shaft coupler 167, as shown, includes five slots 168 configured to receive up to five drive shaft compression fittings 127. In embodiments, drive shaft bonding strength may vary and may be dependent upon multiple factors that include, but are not limited to: the number of drive shaft compression fittings 127 being utilized within drive shaft coupler 167 and the relative distance between drive shaft compression fittings 127 within drive shaft coupler 167.

In order to remove and attach driveshaft coupler 167 to one or more drive shafts 122, driveshaft coupler 167 may be separable into two separate halves, which may be affixed/secured to one another and the one or more drive shafts 122 via attachment members such as, for example, nuts and bolts. As further shown in FIG. 7B, driveshaft coupler 167 is securely affixed to two drive shafts 122 in between two alternative drive shaft attachment mechanism 130 of a single rotor 124.

Figure 8A:
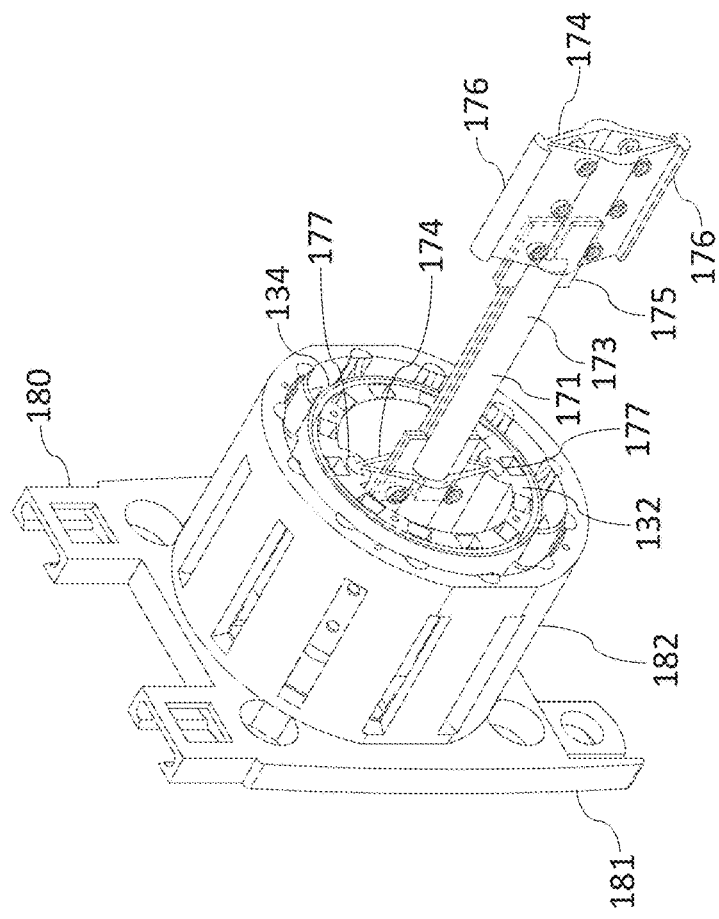
FIG. 8A is an illustration of a partial cutaway view of a rotor sync device affixed to a rotor in accordance with certain embodiments of the present disclosure.
Figure 8B:
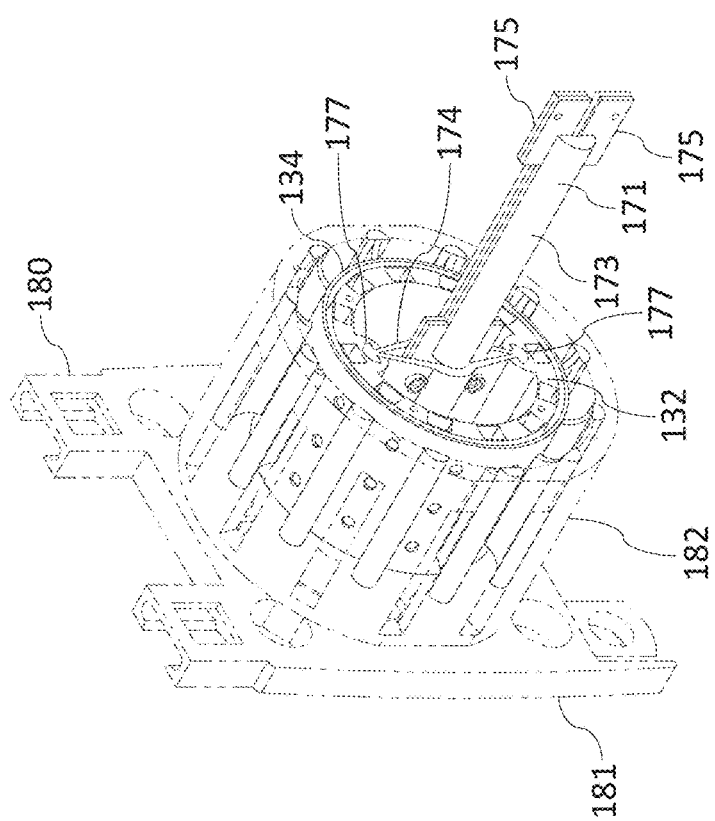
FIG. 8B is an illustration of an additional partial cutaway view of the rotor sync device of FIG. 8A affixed to multiple rotor sleeves in accordance with certain embodiments of the present disclosure.

FIG. 8A is an illustration of a partial cutaway view of a rotor sync device 171 affixed to a rotor 172 in accordance with certain embodiments of the present disclosure. Rotor sync device 171, when affixed to two separate (and opposing) rotors 172, doubles the length of the stator coils that the rotors' magnets' emitted EMF fields pass over, leading to a synchronization of the EMF fields as they pass over the turns in the stator coils cohesively, which doubles the voltage produced (in comparison to two individual, non-synched rotors). As shown, an alternative generator housing 180 includes a base 181 (similar in structure to top plate 112 and separator plate 126) and a casing 182 (similar internal structure to generator housing 116) in which rotor 132 and stator 134 are housed. As further shown, rotor sync device 171 includes an elongated body 173 having first and second ends including fingers 175 (as depicted, a pair of fingers 175 on each end). Each pair of fingers 175 are removably affixable to a sleeve 174 via attachment mechanisms such as, for example, nuts and bolts. Sleeve 174 includes a hollow interior for receiving fingers 175 as well as two opposing elongated protrusions 176 extending the length of sleeve 174. Elongated protrusions 176 are configured to slide into opposing slots 177 defined within rotor 132 in order to stabilize rotor sync device 171. As further shown in FIG. 8B, rotor sync device 171 is shown affixed to two opposing sleeves 174. It is noted that in embodiments, rotor sync device 171, instead of being constructed as two separate halves (as shown, bisected along the length of rotor sync device 171), rotor sync device 171 may be constructed as a unitary body.

Figure 8C:
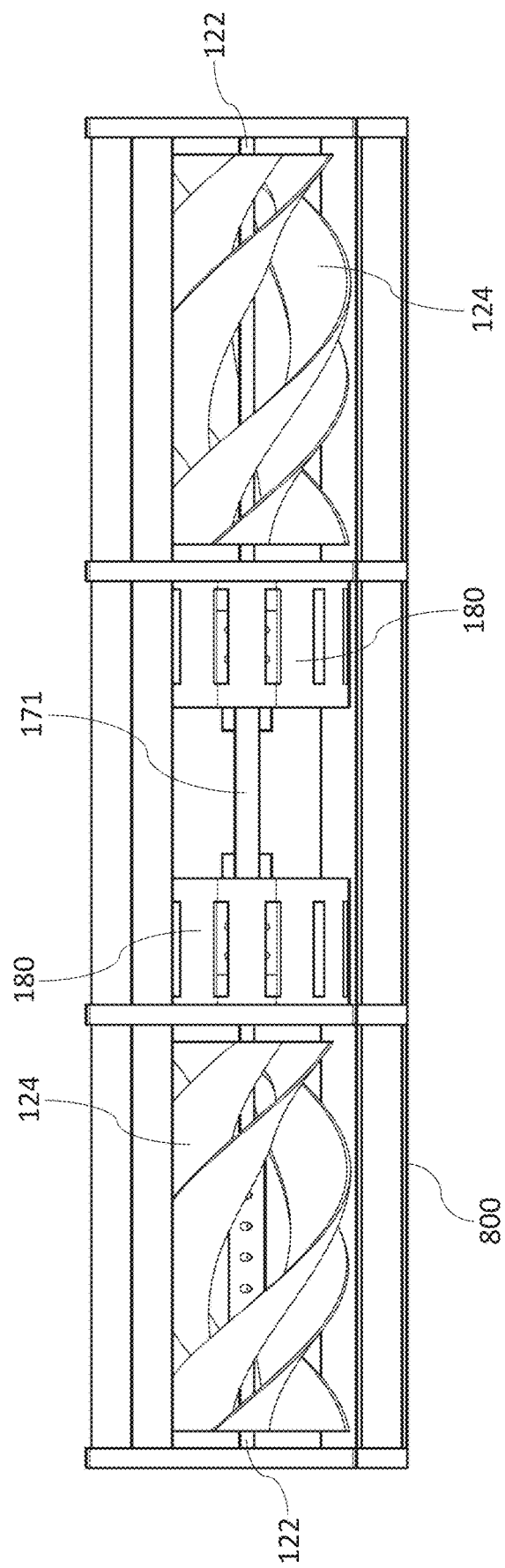
FIG. 8C is an illustration of a perspective view of an alternative wind turbine system including a rotor sync device positioned between two generators in accordance with certain embodiments of the present disclosure.

FIG. 8C is an illustration of a perspective view of an alternative wind turbine system 800 including a rotor sync device 171 positioned between two generators 117 in accordance with certain embodiments of the present disclosure. As shown, rotors 124 are affixed, via drive shafts 122, to generators 117 positioned in opposing fashion within wind turbine system 800. Rotor sync device 171 is positioned between the two generators 117 so that rotors 124/generators 117/drive shafts 122 are all synced to a single rotational speed. Generators 117 are each positioned within respective alternative generator housings 180 that include a space for generators 117 as well as an associated base configuration that is similar in structure/design as separator plates 126 (thus providing similar functionality as separator plates 126).

Figure 9B:
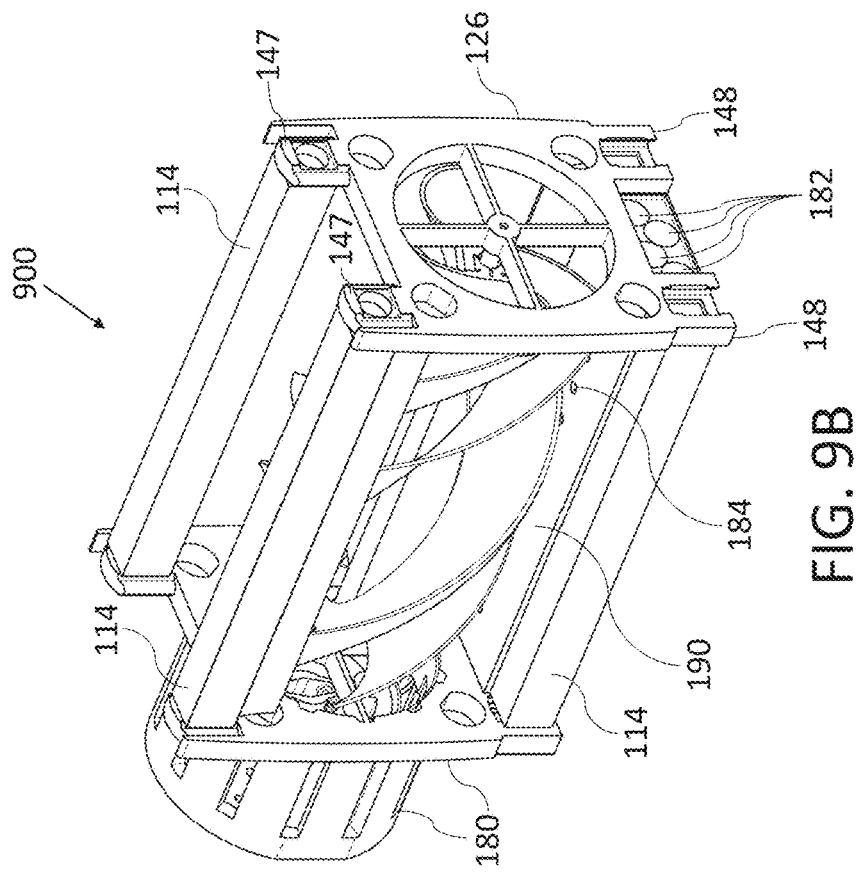
FIG. 9B is an illustration of a perspective view of a utility module incorporated into an alternative wind turbine system in accordance with certain embodiments of the present disclosure.
Figure 9A:
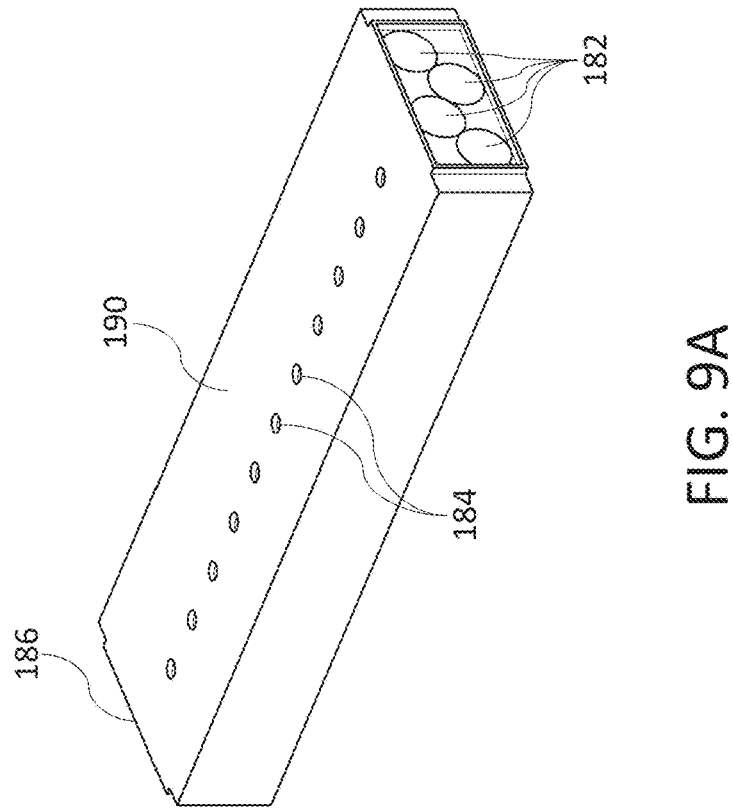
FIG. 9A is an illustration of a perspective view of a utility module in accordance with certain embodiments of the present disclosure.

FIG. 9A is an illustration of a perspective view of a utility module 180 in accordance with certain embodiments of the present disclosure. As shown, utility module 190 is utilized as a reinforcement structure for embodiments of a wind turbine system and is positioned between shroud members 114. Utility module 190 includes a plurality of channels 182 extending along the length of utility module 190. Channels 182, in one embodiment, may be utilized as wiring ducts, where the perpendicular orifices 184 are positioned to deliver wiring between channels 182 and generators 117 associated with wind turbine system 900 (as shown, positioned within alternative generator housing 180 in FIG. 9B). In another embodiment, channels 182 and perpendicular orifices 184 may be utilized as irrigation ducting for de-icing operations. In this embodiment, tubing carrying warm water may be positioned within channels 182, where ends of the tubing may be affixed to spray devices positioned within the perpendicular orifices 184 that may spray the warm water onto portions of a wind turbine system that is underperforming due to freezing.

FIG. 9B is an illustration of a perspective view of a utility module 190 incorporated into an alternative wind turbine system 900 in accordance with certain embodiments of the present disclosure. As shown, utility module 190 is positioned along a length of wind turbine system 900. In order to secure utility module 190 to wind turbine system 900, a flange 186 (located on each end of utility module 190) is insertable within a rectangular space defined between paired male/female attachment segments 147,148 of a separator plate 126 and either an adjacent pair male/female attachment segments 147,148 or a male/female end cap 136,135.

Figure 10:
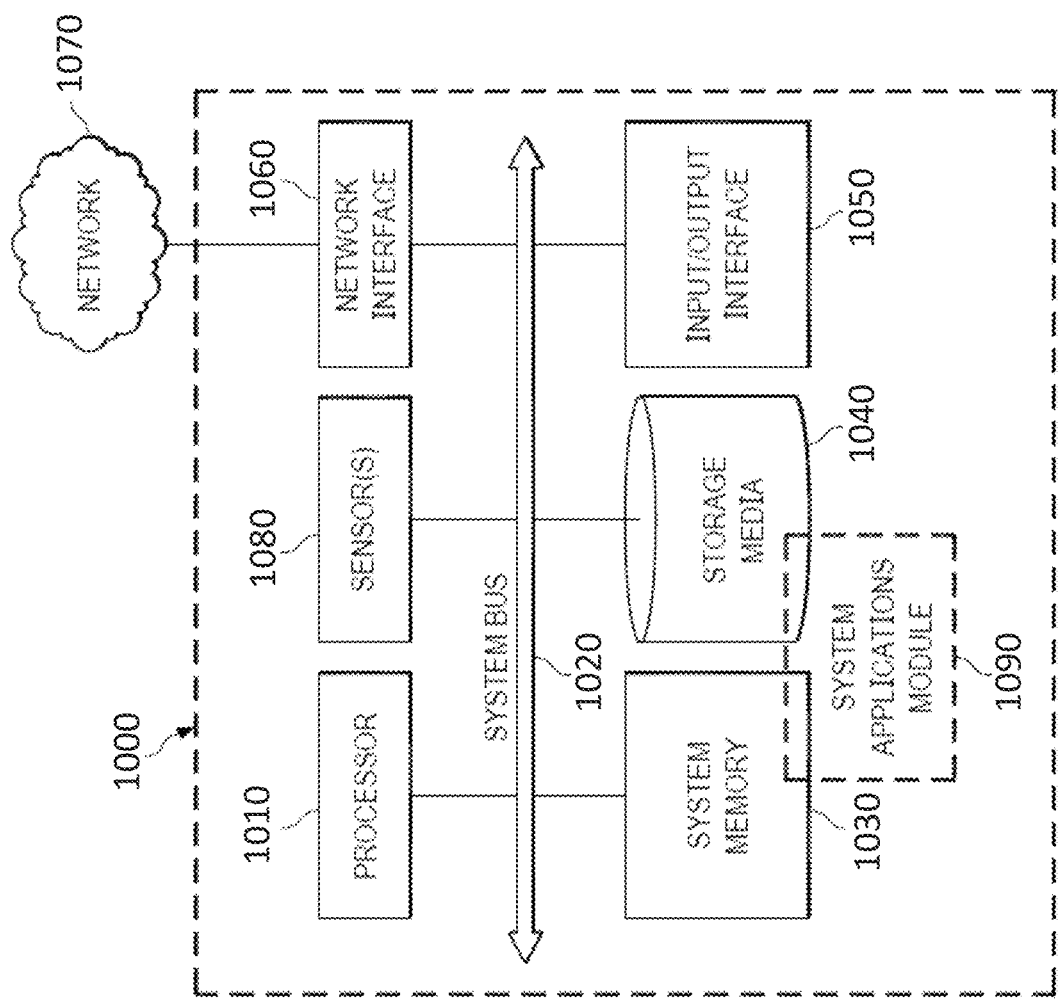
FIG. 10 is an illustration of a computing machine and a system applications module in accordance with certain example embodiments.

Referring now to FIG. 10, illustrated is a computing machine 1000 and a system applications module 990, in accordance with example embodiments. The computing machine 1000 can correspond to any of the various computers, mobile devices, laptop computers, Internet of Things (IoT), servers, embedded systems, or computing systems presented herein. The module 1090 can comprise one or more hardware or software elements, e.g. other OS application and user and kernel space applications, designed to facilitate the computing machine 1000 in performing the various methods and processing functions presented herein. The computing machine 1000 can include various internal or attached components such as a processor 1010, system bus 1020, system memory 1030, storage media 1040, input/output interface 1050, a network interface 1060 for communicating with a network 1070, e.g. cellular/GPS, Bluetooth, WIFI, or Devicenet, EtherCAT, Analog, RS485, etc., and one or more sensors 1080.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

Processor 1010 can be designed to execute code instructions in order to perform the operations and functionality described herein, manage request flow and address mappings, and to perform calculations and generate commands. Processor 1010 can be configured to monitor and control the operation of the components in the computing machines. Processor 1010 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. Processor 1010 can be a single processing unit, multiple processing units, a single processing core, multiple processing cores, special purpose processing cores, co-processors, or any combination thereof. According to certain embodiments, processor 1010 along with other components of computing machine 1000 can be a software based or hardware based virtualized computing machine executing within one or more other computing machines.

The system memory 1030 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 1030 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 1030. The system memory 1030 can be implemented using a single memory module or multiple memory modules. While the system memory 1030 is depicted as being part of the computing machine, one skilled in the art will recognize that the system memory 1030 can be separate from the computing machine 1000 without departing from the scope of the subject technology. It should also be appreciated that the system memory 1030 can include, or operate in conjunction with, a non-volatile storage device such as the storage media 1040.

The storage media 1040 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 1040 can store one or more operating systems, application programs and program modules, data, or any other information. The storage media 1040 can be part of, or connected to, the computing machine. The storage media 1040 can also be part of one or more other computing machines that are in communication with the computing machine such as servers, database servers, cloud storage, network attached storage, and so forth.

The applications module 1090 and other OS application modules can comprise one or more hardware or software elements configured to facilitate the computing machine with performing the various methods and processing functions presented herein. The applications module 1090 and other OS application modules can include one or more algorithms or sequences of instructions stored as software or firmware in association with the system memory 1030, the storage media 1040 or both. The storage media 1040 can therefore represent examples of machine or computer readable media on which instructions or code can be stored for execution by the processor 1010. Machine or computer readable media can generally refer to any medium or media used to provide instructions to the processor 1010. Such machine or computer readable media associated with the applications module 1090 and other OS application modules can comprise a computer software product. It should be appreciated that a computer software product comprising the applications module 1090 and other OS application modules can also be associated with one or more processes or methods for delivering the applications module 1090 and other OS application modules to the computing machine via a network, any signal-bearing medium, or any other communication or delivery technology. The applications module 1090 and other OS application modules can also comprise hardware circuits or information for configuring hardware circuits such as microcode or configuration information for an FPGA or other PLD. In one exemplary embodiment, applications module 1090 and other OS application modules can include algorithms capable of performing the functional operations described by the flow charts (modes of operation) computer systems presented herein.

The input/output ("I/O") interface 1050 can be configured to couple to one or more external devices, to receive data from the one or more external devices, and to send data to the one or more external devices. Such external devices along with the various internal devices can also be known as peripheral devices. The I/O interface 1050 can include both electrical and physical connections for coupling the various peripheral devices to the computing machine or the processor 1010. The I/O interface 1050 can be configured to communicate data, addresses, and control signals between the peripheral devices, the computing machine, or the processor 1010. The I/O interface 1050 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 1050 can be configured to implement only one interface or bus technology. Alternatively, the I/O interface 1050 can be configured to implement multiple interfaces or bus technologies. The I/O interface 1050 can be configured as part of, all of, or to operate in conjunction with, the system bus 1020. The I/O interface 1050 can include one or more buffers for buffering transmissions between one or more external devices, internal devices, the computing machine, or the processor 1020.

The I/O interface 1020 can couple the computing machine 1000 to various input devices including mice, touch-screens, scanners, electronic digitizers, sensors, receivers, touchpads, trackballs, cameras, microphones, keyboards, any other pointing devices, or any combinations thereof. The I/O interface 1020 can couple the computing machine 1000 to various output devices including video displays, speakers, printers, projectors, tactile feedback devices, automation control, robotic components, actuators, motors, fans, solenoids, valves, pumps, transmitters, signal emitters, lights, and so forth.

The computing machine 1000 can operate in a networked environment using logical connections through the NIC 1060 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The one or more sensors 1080 can be a position sensor and pressure sensors. The pressure sensor can be an Absolute Pressure (P) sensor or a Differential Pressure (DP) sensor. The position sensor can be a capacitive, optical, strain gauge, or magnetic sensor. The sensors 1080 can be traditional sensors or semiconductor based sensors.

The processor 1010 can be connected to the other elements of the computing machine or the various peripherals discussed herein through the system bus 1020. It should be appreciated that the system bus 1020 can be within the processor 1010, outside the processor 1010, or both. According to some embodiments, any of the processors 1010, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 11:
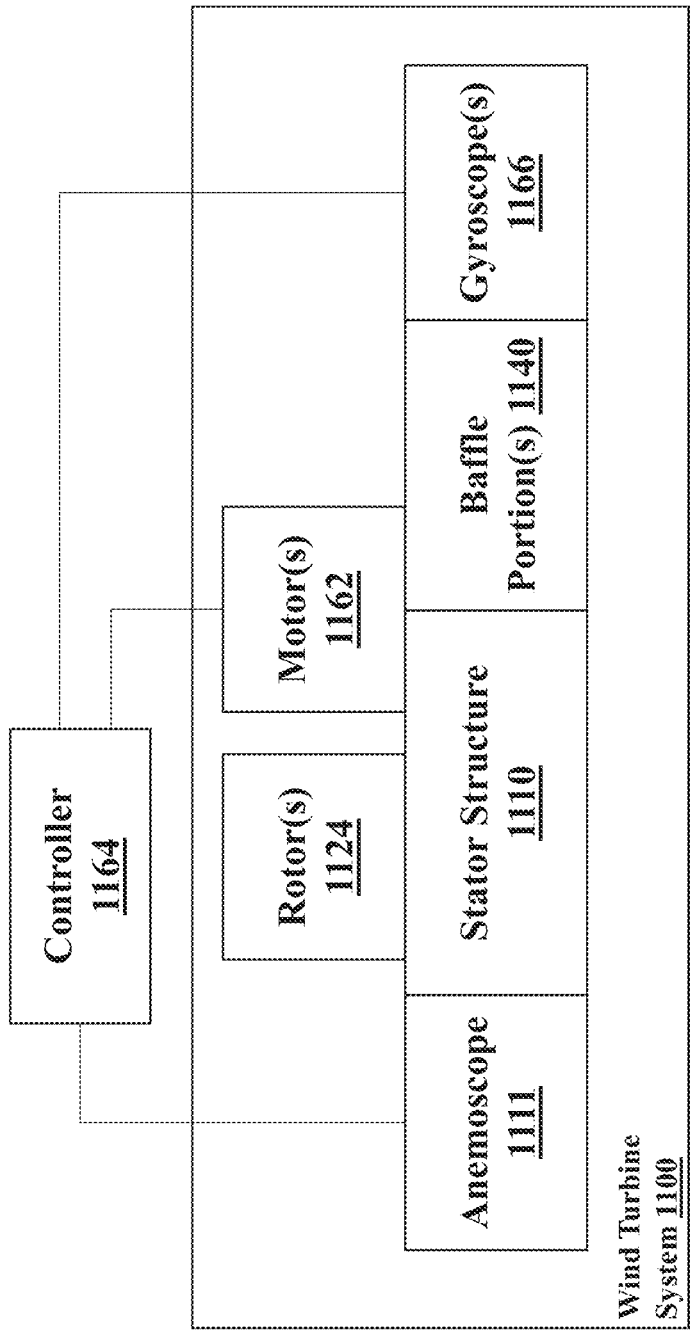
FIG. 11 is an illustration of a diagrammatic view of a modular wind turbine system including one or more baffle portions for deflecting airflow toward a plurality of rotors in accordance with certain embodiments of the present disclosure.

FIG. 11 is an illustration of a diagrammatic view of a modular wind turbine system 1100 including one or more baffle portions 1140 for deflecting airflow toward a plurality of rotors 1124 in accordance with certain embodiments of the present disclosure. Controller 1164 may comprise logic, circuitry, memory, and one or more processing elements (processors). Although a general controller is illustrated in this specific example, it is to be understood that controller 1164 is but one of many potential controllers as will be readily apparent to one of ordinary skill in the art. For example, in some embodiments, controller 1164 may be a lead-lag controller, a gain-lead-lag controller (e.g., as described in U.S. Pat. No. 6,962,164 incorporated in its entirety by reference herein), a PID controller, or any other controller sufficient for the application. Controller 1164 may be implemented as either hardware or firmware. Controller 1164 is configured to control the position of one or more baffle portions 1140 affixed to wind turbine system 1100 in accordance with an airflow reading indicating a wind speed and/or wind direction from anemoscope 1111 as well as an orientation reading from gyroscope 1166 affixed to the one or more baffle portions 1140. For instance, in one embodiment, controller 1164 receives a direction of airflow (wind) from anemoscope 1111 and orientation data for the one or more baffle portions 1140 from one or more gyroscopes 1166 affixed to each of the baffle portions 1140. Controller 1164 uses the received information to convert the airflow direction data and the orientation data into one or more signals indicative of mechanical outputs/rotational outputs of the motors 1162.

As shown, an anemoscope 1111 is affixed to stator structure 1110/wind turbine system 1100 at a position/orientation where anemoscope 1111 can collect wind (airflow) direction data. A motor 1162 is rotationally affixed to each of the plurality of structural members (see FIG. 1) of stator structure 1110 that include a baffle portion 1140. In embodiments, each motor 1162 may be affixed to either of a structural member or an adjacent separator plate/top plate/generator housing (see FIG. 1). Additionally, a gyroscope 1166 is affixed to each of the baffle portions 1140.

Controller 1164 electrically connected to anemoscope 1011 and motor 1162 is configured to: receive wind direction data from anemoscope 1164 and receive orientation data from gyroscopes 1166. Further, based on the wind direction data and the orientation data, controller 1164 is configured to adjust a rotational output for motor 1162 to position each of the baffle portions 1140 at a deflection angle for deflecting a maximum amount of wind toward respective rotors 1124 of the plurality of rotors 1124.

Figure 12:
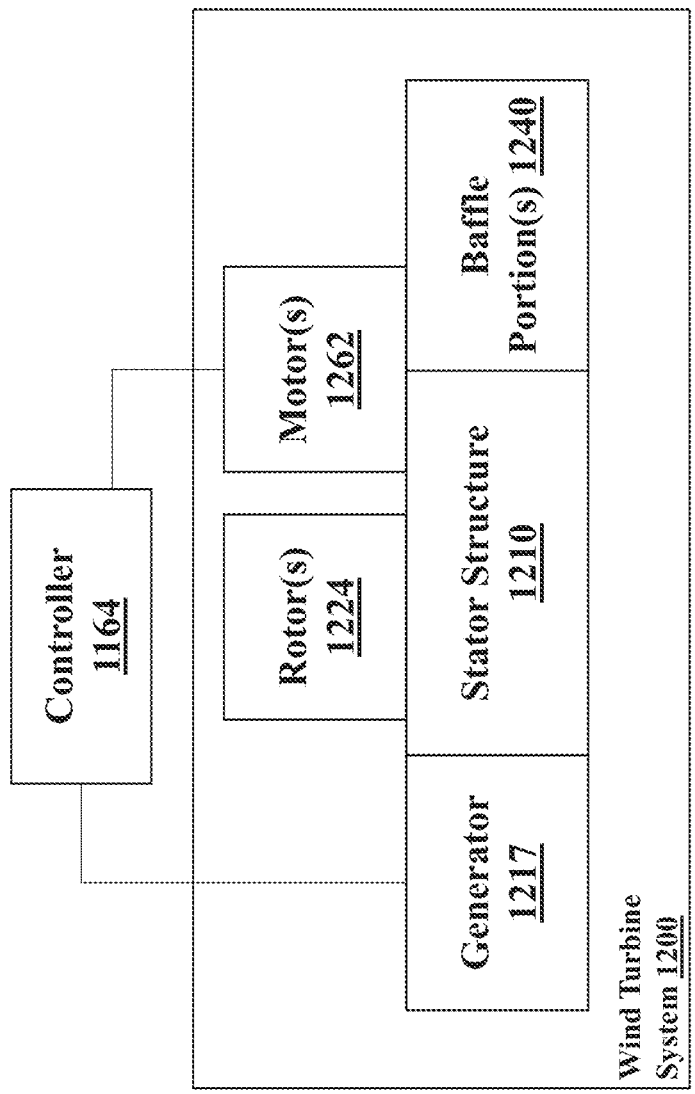
FIG. 12 is an illustration of a diagrammatic view of a modular wind turbine system including one or more baffle portions for decreasing rotational speeds of a plurality of rotors in accordance with certain embodiments of the present disclosure.

FIG. 12 is an illustration of a diagrammatic view of a modular wind turbine system 1200 including one or more baffle portions for decreasing rotational speeds of a plurality of rotors in accordance with certain embodiments of the present disclosure. It is noted that controller 1164 described previously may be utilized in the current embodiment. Controller 1164, in this embodiment, is configured to control the position of one or more baffle portions 1240 affixed to wind turbine system 1200 in accordance with rotation speed data of a generator 1217. For instance, in one embodiment, controller 1164 receives a rotation speed from generator 1217. Controller 1164 uses the received information to convert the rotation speed data into one or more signals indicative of mechanical outputs/rotational outputs of the motors 1262.

As shown, a motor 1262 is rotationally affixed to each of the plurality of structural members (see FIG. 1) of stator structure 1210 that include a baffle portion 1240. In embodiments, each motor 1262 may be affixed to either of a structural member or an adjacent separator plate/top plate/generator housing (see FIG. 1). Controller 1164 electrically connected to generator 1217 and motor 1262 is configured to: receive rotation speed data from generator 1217 and adjust, based on the rotation speed data, a rotational output for motor 1262 to position each of the baffle portions 1240 at a drag angle for decreasing a rotational speed of respective rotors 1224 of the plurality of rotors 1224.

It is noted that in regard to systems 1100, 1200, in embodiments, motors 1162,1262 may be affixed to a side of shroud members 114 of stator structures 1110,1210. Motors 1162,1262 may include a belt drive (not depicted) that is wrapped around a driving pulley of motors 1162,1262 and around shroud members 114 in order to rotate shroud members 114 when motors 1162,1262 are turned on. In order to more easily turn shroud members 114, the portion of shroud member 114 where the belt drive is wrapped around may be cylindrical (as opposed to rectangular). Additionally, in order for shroud members 114 to rotate, flanged ends 143 (which, as depicted, are square-shaped) may be cylindrical in shape with a diameter the same as the square-shaped flanged ends 143 so that shroud members 114 may freely rotate within male/female attachment segments 147/148 of separator plates 126.

Figure 13:
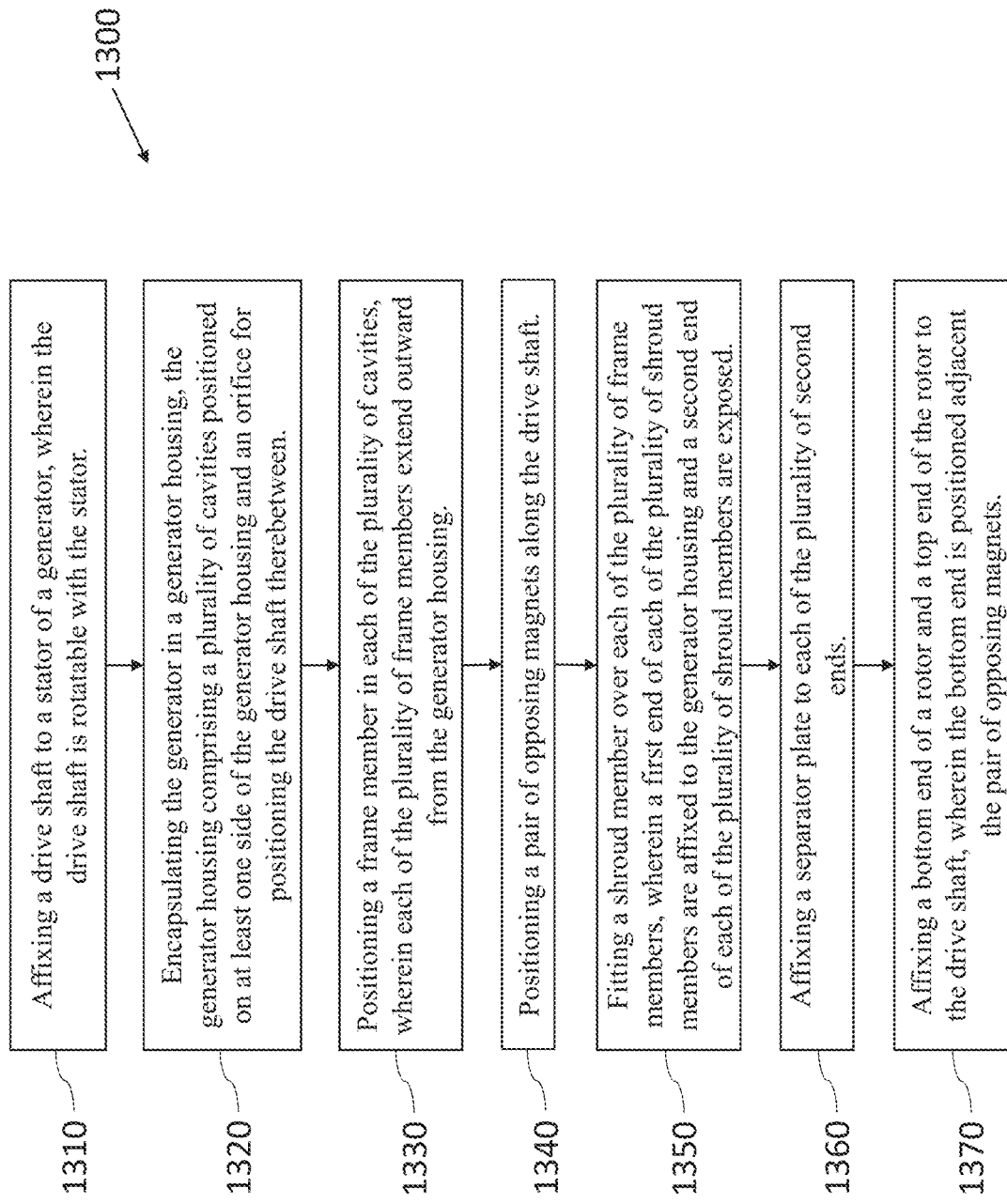
FIG. 13, which is an illustration of a flowchart embodying a method for manufacturing a wind turbine system in accordance with certain embodiments of the present disclosure.

FIG. 13 is an illustration of a flowchart embodying a method 1300 for manufacturing a wind turbine system (such as, for example, wind turbine system 100) in accordance with certain embodiments of the present disclosure. For discussion purposes, method 1300 is described using elements from any of the disclosed embodiments. Additionally, elements may include additional details, features, elements, or embodiments not presented below but presented within other disclosed embodiments.

At block 1310, a drive shaft is affixed to a stator of a generator, wherein the drive shaft is rotatable with the stator.

At block 1320, the generator is encapsulated in a generator housing, where the generator housing comprising a plurality of cavities positioned on at least one side of the generator housing and an orifice for positioning the drive shaft therebetween.

At block 1330, a frame member is positioned in each of the plurality of cavities, where each of the plurality of frame members extend outward from the generator housing.

At block 1340, a pair of opposing magnets (like poles of each magnet facing one another) are positioned along the drive shaft.

At block 1350, a shroud member is fitted over each of the plurality of frame members, where a first end of each of the plurality of shroud members are affixed to the generator housing and a second end of each of the plurality of shroud members are exposed.

At block 1360, a separator plate is affixed to each of the plurality of second ends.

At block 1370, a bottom end of a rotor and a top end of the rotor is affixed to the drive shaft, wherein the bottom end is positioned adjacent the pair of opposing magnets.

In relation to method 1300, it is noted that the assembly/manufacturing of wind turbine system 100 may be performed without any additional hardware or extraneous attachment elements (such as, for example, screws).

In an embodiment of method 1300, an additional step includes: positioning an additional pair of opposing magnets along the drive shaft prior to affixing the separator plate, where the additional pair of opposing magnets are positioned adjacent the top end of the rotor opposite the pair of opposing magnets.

In an embodiment of method 1300, the step of affixing a bottom end of a rotor and a top end of the rotor to the drive shaft is performed prior to one or both steps of: affixing a separator plate to each of the plurality of second ends and fitting a shroud member over each of the plurality of frame members.

In an embodiment of method 1300, an additional step includes: fitting an additional plurality of shroud members over each of the plurality of frame members, affixing first ends of the additional plurality of shroud members to the separator plate, affixing an additional separator plate to the second ends of the additional plurality of shroud members, and affixing a bottom end and top end of an additional rotor to the drive shaft. This additional step may be repeated more than once in additional embodiments.

In an embodiment, drive shaft 122 is not longer than four feet in length.

In an embodiment, a generator of any of the disclosed embodiments may be electrically connected to a battery or other electricity storage device in order to store the electricity produced from the rotors.

In an embodiment, any device that converts mechanical energy into electrical energy may be utilized in place of a generator and may include, but is not limited to: an alternator.

In embodiments, any of the disclosed wind turbine systems may be utilized in conjunction with fluids other than air/wind and may include, but are not limited to: water (within, for example, the ocean, rivers, streams, etc.), waste steam, and other vented gases from extraneous processes.

In embodiments, any of the disclosed wind turbine systems may be utilized either vertically or horizontally (in relation to the ground or a surface that the wind turbine system is positioned on). In further embodiments, any of the disclosed wind turbine systems may be utilized at an angle (that is not vertical or horizontal).

In embodiments, any of the disclosed wind turbine systems may comprise a generator housing, rotors, shroud members, and separator plates that all comprise a plastic material. By virtue of this feature, a lightweight and efficient wind turbine system is created.

In embodiments, wind turbine system may comprise a cut-in speed of 0.1 m/s or less. This low cut-in speed (understood to be low relative to the turbine industry as a whole) results from the combination of embodying: a single point of parasitic friction (ball bearing in stator 134 of generator 117) and light-weight components. By virtue of this low cut-in speed, electrical output from the wind turbine system in the long run can be greatly increased by providing electrical power in a wider range of speeds. Additionally, wind turbine system may also embody this low cut-in speed when utilized with fluids other than air/wind such as, for example, water.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a wind turbine system, comprising: a stator structure, the stator structure comprising a plurality of structural members and a top plate positioned at a top end of the stator structure, wherein the plurality of structural members, the top plate, and a generator housing positioned distal to the top plate define an interior volume within the stator structure; a turbine, comprising: a drive shaft positioned along a central axis extending from the top plate to the generator housing; and a plurality of rotors positioned along the drive shaft, each rotor of the plurality of rotors separated from one or more adjacent rotors of the plurality of rotors along the central axis via one or more separator plates each defining a stability plane extending perpendicular to the central axis; and a generator positioned in the generator housing.

Clause 2, the system of Clause 1, wherein each of the one or more separator plates comprise one or more attachment edges each having one or more attachment segments.

Clause 3, the system of Clause 2, further comprising at least one additional wind turbine system each removably affixable to the wind turbine system along at least one of the one or more stability planes, the wind turbine system and the at least one additional wind turbine system removably affixable via engagement of at least one of the one or more attachment segments to at least one of one or more attachment segments of each of the at least one additional wind turbine system.

Clause 4, the system of Clause 3, wherein the wind turbine system and each of the at least one additional wind turbine system share at least one structural member of the plurality of structural members.

Clause 5, the system of Clause 3, wherein each of the wind turbine system and the at least one additional wind turbine system supply electrical energy to a battery.

Clause 6, the system of Clause 1, wherein each rotor of the plurality of rotors comprises a pair of magnets having a first magnet and a second magnet positioned at respective top ends and bottom ends of each rotor of the plurality of rotors, further wherein each pair of the pair of magnets equally distributes each rotor of the plurality of rotors along the drive shaft and between two of the one or more stability planes.

Clause 7, the system of Clause 1, further comprising a set of the plurality of structural members positioned adjacent each rotor of the plurality of rotors, wherein the plurality of structural members is positioned parallel to the central axis.

Clause 8, the system of Clause 7, wherein at least one of the plurality of structural members comprises a baffle portion configured to direct airflow toward or away from a respective rotor of the plurality of rotors.

Clause 9, the system of Clause 8 wherein at least one baffle portion comprises a braking device affixed to an edge of each of the at least one baffle portion and is positioned within a rotation path of at least one of the plurality of rotors to reduce a rotation speed of at least one of the plurality of rotors via friction.

Clause 10, the system of Clause 8, wherein at least one of the plurality of structural members is rotatable to provide contact between the at least one baffle portion and respective rotors of the plurality of rotors.

Clause 11, the system of Clause 8, wherein the at least one baffle portion comprises rubber, silicone, TPU, or TPC.

Clause 12, the system of Clause 10, further comprising: an anemoscope affixed to the stator structure; a motor rotationally affixed to each of the plurality of structural members comprising a respective one of the at least one baffle portion; a gyroscope affixed to each of the at least one baffle portion; and a controller electrically connected to the anemoscope and the motor, the controller configured to: receive wind direction data from the anemoscope; receive orientation data from the at least one gyroscope; and adjust, based on the wind direction data and the orientation data, a rotational output for the motor to position each of the at least one baffle portion at a deflection angle for deflecting a maximum amount of wind toward respective rotors of the plurality of rotors.

Clause 13, the system of Clause 10, further comprising: a motor rotationally affixed to each of the plurality of structural members comprising a respective one of the at least one baffle portion; and a controller electrically connected to the generator and the motor, the controller configured to: receive rotation speed data from the generator; and adjust, based on the rotation speed data, a rotational output for the motor to position each of the at least one baffle portion at a drag angle for decreasing a rotational speed of respective rotors of the plurality of rotors.

Clause 14, the system of Clause 1, wherein each rotor of the plurality of rotors comprises a helical configuration having a pair of helical blades.

Clause 15, the system of Clause 14, wherein the pair of helical blades are affixed to the drive shaft via a compression fitting.

Clause 16, the system of Clause 1, wherein the generator further comprises a stator shell positioned within the generator housing.

Clause 17, the system of Clause 16, further comprising a back pressure regulator positioned in the generator housing, the back pressure regulator configured to generate a pressure differential within air diversion manifolds defined between the stator shell and a generator stator.

Clause 18, the system of Clause 1, wherein the drive shaft is not longer than four feet in length.

Clause 19, the system of Clause 1, wherein the wind turbine system comprises a cut-in speed of 0.1 m/s or less.

Clause 20, the system of Clause 1, wherein a manufacturing process of the wind turbine system is performed without extraneous attachment elements.

What is claimed is:

1. A wind turbine system, comprising:
   a stator structure, the stator structure comprising a plurality of structural members positioned parallel to a central axis and a top plate positioned at a top end of the stator structure, wherein the plurality of structural members, the top plate, and a generator housing positioned distal to the top plate define an interior volume within the stator structure;
   a turbine, comprising:
      a drive shaft positioned along the central axis and extending from the top plate to the generator housing;
      and
      a plurality of rotors positioned along the drive shaft, each rotor of the plurality of rotors separated from one or more adjacent rotors of the plurality of rotors along the central axis via one or more separator plates each defining a stability plane extending perpendicular to the central axis; and
   a generator positioned in the generator housing;
   wherein a set of the plurality of structural members is positioned adjacent each rotor of the plurality of rotors, further wherein at least one of the plurality of structural members comprises a baffle portion configured to direct airflow toward or away from a respective rotor of the plurality of rotors, further wherein at least one baffle portion comprises a braking device affixed to an edge of each of the at least one baffle portion and is positioned within a rotation path of at least one of the plurality of rotors to reduce a rotation speed of at least one of the plurality of colors via friction.

2. The system of claim 1, wherein each of the one or more separator plates comprise one or more attachment edges each having one or more attachment segments.

3. The system of claim 2, further comprising at least one additional wind turbine system each removably affixable to the wind turbine system along at least one of the one or more stability planes, the wind turbine system and the at least one additional wind turbine system removably affixable via engagement of at least one of the one or more attachment segments to at least one of one or more attachment segments of each of the at least one additional wind turbine system.

4. The system of claim 3, wherein the wind turbine system and each of the at least one additional wind turbine system share at least one structural member of the plurality of structural members.

5. The system of claim 3, wherein each of the wind turbine system and the at least one additional wind turbine system supply electrical energy to a battery.

6. The system of claim 1, wherein each rotor of the plurality of rotors comprises a pair of magnets having a first magnet and a second magnet positioned at respective top ends and bottom ends of each rotor of the plurality of rotors, further wherein each pair of the pair of magnets equally distributes each rotor of the plurality of rotors along the drive shaft and between two of the one or more stability planes.

7. The system of claim 1, wherein at least one of the plurality of structural members is rotatable to provide contact between the at least one baffle portion and respective rotors of the plurality of rotors.

8. The system of claim 7, further comprising:
   an anemoscope affixed to the stator structure;
   a motor rotationally affixed to each of the plurality of structural members comprising a respective one of the at least one baffle portion;
   a gyroscope affixed to each of the at least one baffle portion; and
   a controller electrically connected to the anemoscope and the motor, the controller configured to:
      receive wind direction data from the anemoscope;
      receive orientation data from the at least one gyroscope; and
      adjust, based on the wind direction data and the orientation data, a rotational output for the motor to position each of the at least one baffle portion at a deflection angle for deflecting a maximum amount of wind toward respective rotors of the plurality of rotors.

9. The system of claim 7, further comprising:
   a motor rotationally affixed to each of the plurality of structural members comprising a respective one of the at least one baffle portion; and
   a controller electrically connected to the generator and the motor, the controller configured to:
      receive rotation speed data from the generator; and
      adjust, based on the rotation speed data, a rotational output for the motor to position each of the at least one baffle portion at a drag angle for decreasing a rotational speed of respective rotors of the plurality of rotors.

10. The system of claim 1, wherein the at least one baffle portion comprises rubber, silicone, TPU, or TPC.

11. The system of claim 1, wherein each rotor of the plurality of rotors comprises a helical configuration having a pair of helical blades.

12. The system of claim 11, wherein the pair of helical blades are affixed to the drive shaft via a compression fitting.

13. The system of claim 1, wherein the generator further comprises a stator shell positioned within the generator housing.

14. The system of claim 13, further comprising a back pressure regulator positioned in the generator housing, the back pressure regulator configured to generate a pressure differential within air diversion manifolds defined between the stator shell and a generator stator.

15. The system of claim 1, wherein the drive shaft is not longer than four feet in length.

16. The system of claim 1, wherein the wind turbine system comprises a cut-in speed of 0.1 m/s or less.

17. The system of claim 1, wherein the wind turbine system is assembled without extraneous attachment elements.

* * * * *